(No Model.)
J. W. SMITH.
BEE HIVE.
No. 306,357. Patented Oct. 7, 1884.
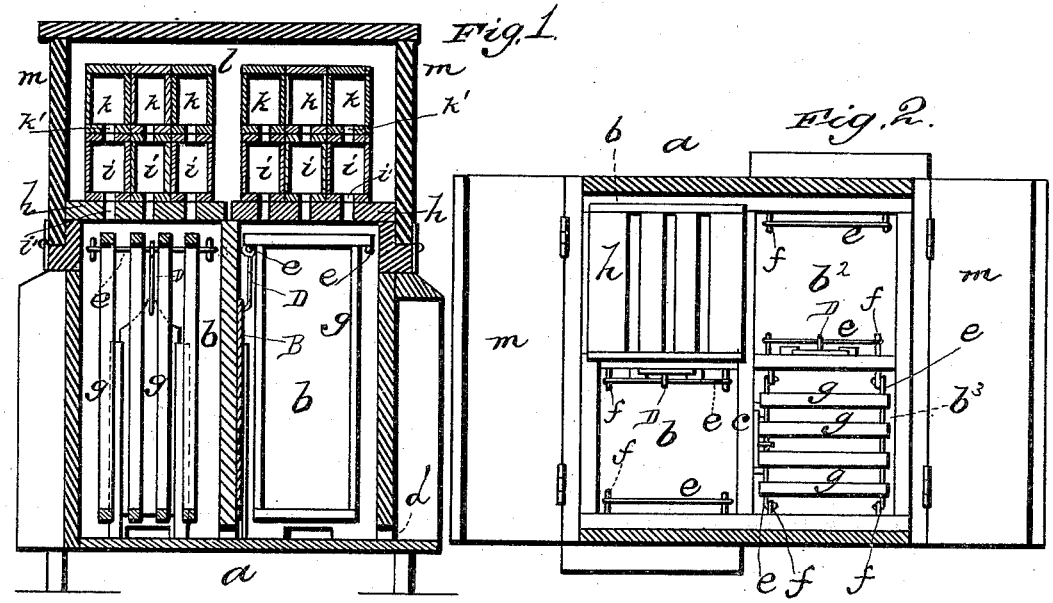
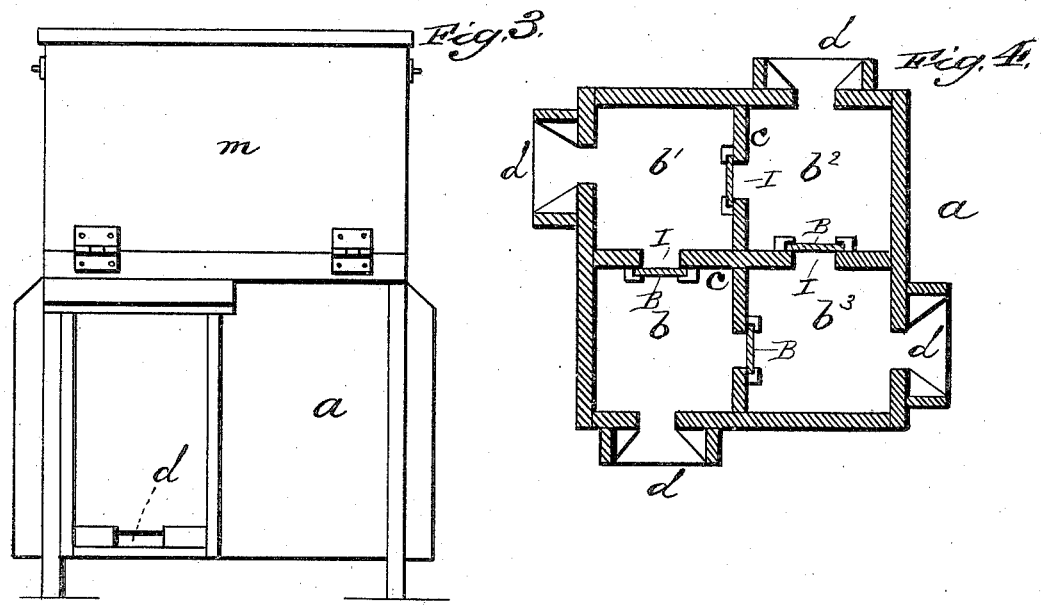
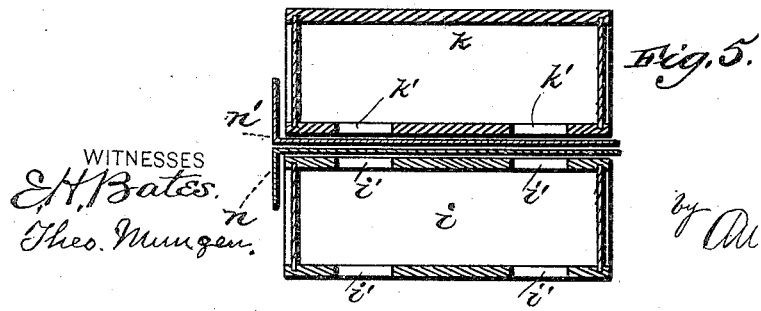
WITNESSES
E. H. Bates.
Theo. Mungen.
INVENTOR
J. W. Smith,
by Anderson & Smith
his ATTORNEYS

UNITED STATES PATENT OFFICE.

JAMES WASHINGTON SMITH, OF PLEASANT VIEW, TENNESSEE.

BEE-HIVE.

SPECIFICATION forming part of Letters Patent No. 306,357, dated October 7, 1884.

Application filed October 26, 1883. (No model.)

*To all whom it may concern:*

Be it known that I, J. W. SMITH, a citizen of the United States, residing at Pleasant View, in the county of Cheatham and State of Tennessee, have invented certain new and useful Improvements in Bee-Hives; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a vertical transverse sectional view. Fig. 2 is a horizontal sectional view. Fig. 3 is a side elevation. Fig. 4 is a horizontal sectional view with the sashes, boxes, and horizontal partitions removed, and Fig. 5 is a sectional detail view of the honey-boxes and the tins temporarily between them.

This invention has relation to colony bee-hives; and it consists in the construction and novel arrangement of parts, as will be hereinafter fully described, and particularly pointed out in the claim appended.

Referring by letter to the accompanying drawings, $a$ designates the bee-hive, which is separated into four compartments, $b\ b'\ b^2\ b^3$, by the ordinary division-boards, $c$, and is provided with an entrance, $d$, on each side near one end. The hive is preferably thirty inches square, and the sides are made similar in appearance.

Near the upper edges of each compartment $b\ b'\ b^2\ b^3$, at opposite sides thereof, and at right angles to the points of entrance of the several compartments, parallel wires $e\ e$ are stretched from eyes $f$, projecting from the walls of the compartments. These wires $e\ e$ form the supports for the sashes $g$, which are thus prevented from coming in contact with the walls of the compartments, thereby permitting the sashes to be readily removed and replaced. Further, the space left between the sashes and the walls of the compartments enables the bees to follow the moth to any part of the hive and destroy its eggs. The exits I of the compartments $b\ b'\ b^2\ b^3$ are respectively closed by slides B, which are suspended by hook-arms D from the transverse wires $e$.

The compartments $b\ b'\ b^2\ b^3$ are covered by slatted horizontal partitions $h$, upon which the boxes $i$, with holes $i'$ in their tops and bottoms, rest. The boxes $k$, with holes $k'$ in their bottoms, only rest on the boxes $i$, the holes $i'$ and $k'$ being aligned.

The box-compartment $l$ of the hive is provided with hinged doors $m\ m$, opening downwardly.

I place a colony of bees in compartment $b$, and when it is nearly filled I stop up the entrance to compartment $b$, and raise the drop-door in compartment $b'$, and turn the hive one-fourth round, bringing the entrance to $b'$ into the place formerly occupied by $b$. This change does not bother the workers in their course, and they will then fill $b'$. Similar changes for $b^2$ and $b^3$ are afterward made at the proper time, and the bees will continue to swarm in the hive and not out on the trees.

Compartments $b$ and $b^2$ may be provided each with a colony at the same time, and the bees in $b$ will fill compartment $b'$, and those in $b^2$ will fill compartment $b^3$. When all four are completed, in early spring, I take the colonies from $b$ and $b^2$ and place them in another hive of similar construction—one in $b$ and one in $b^2$ of the new hive. This change leaves two compartments in each hive to fill, the swarming being all done in the hive.

In taking the honey from the hive it can be done without danger of being stung by a very simple means which I have provided. Open the hinged door and slip two pieces, $n\ n'$, of tin between an upper and a lower box. Draw the upper box with the upper tin, $n'$, held against its bottom from the hive, leaving the lower tin, $n$, on the lower box, which will imprison the bees. Turn the upper over and set it down, leaving the tin $n'$ over the holes. Place a new top box on the tin still resting on the lower box in the hive, withdraw the tin, and the bees will enter the new box. Close the hinged door and remove the tin $n'$ from the box that has been taken out of the hive, and the bees in said box will come out and go directly into the hive without any attempt at stinging.

The operation of taking honey may be performed by a lady or any person possessing sufficient skill to manipulate the tins and boxes without the slightest danger of being stung.

The hive is cheap and simple in its construction, and does not expose as much surface to the cold in winter as the single-colony hives, and by its use the bees will be always swarmed in the hive.

When it is necessary to look for moths, I blow a little smoke into the hives, which drives the bees up into the honey-boxes. I then insert the tin plates under the lower boxes, which prevents the return of the bees, and then clean the moths out.

I am aware that it is not new to construct a hive with four communicating compartments, each having an entrance and a slide for closing communication between the respective compartments, and that it is also old to provide the sashes with hooked arms by which to suspend them from a wire extending across each compartment, and therefore do not claim such constructions, broadly; but,

Having thus fully described my invention, what I claim as new, and desire to secure by Letters Patent, is—

The bee-hive described, provided with the compartments $b$ $b'$ $b^2$ $b^3$, having an entrance, $d$, and an exit, I, the slides B, suspended by a hook-arm, D, the wires $e$, eyes $f$, the sashes $g$, and the slotted horizontal partition $h$, for supporting the boxes $i$, all arranged substantially as shown and described.

In testimony whereof I affix my signature in presence of two witnesses.

JAMES WASHINGTON SMITH.

Witnesses:
A. J. HUNT,
M. W. SMITH.